US008442533B2

(12) United States Patent  
Neubacher

(10) Patent No.: US 8,442,533 B2  
(45) Date of Patent: May 14, 2013

(54) METHOD FOR PREVENTING PING-PONG HANDOVER IN MOBILE RADIO NETWORKS

(75) Inventor: Andreas Neubacher, Korneuburg (AT)

(73) Assignee: T-Mobile International AG, Bonn (DE)

( * ) Notice: Subject to any disclaimer, the term of this patent is extended or adjusted under 35 U.S.C. 154(b) by 107 days.

(21) Appl. No.: 12/706,337

(22) Filed: Feb. 16, 2010

(65) Prior Publication Data

US 2010/0210271 A1    Aug. 19, 2010

Related U.S. Application Data

(63) Continuation of application No. PCT/EP2008/006621, filed on Aug. 12, 2008.

(30) Foreign Application Priority Data

Aug. 13, 2007   (DE) .......................... 10 2007 038 099

(51) Int. Cl.
  *H04W 36/00*   (2009.01)
(52) U.S. Cl.
  USPC .......................................... 455/436; 455/437
(58) Field of Classification Search .................. 455/424, 455/456.1, 67.1, 515, 436–444, 522; 370/328, 370/331, 332
  See application file for complete search history.

(56) References Cited

U.S. PATENT DOCUMENTS

| 6,745,032 | B1 * | 6/2004 | Alvesalo et al. .............. 455/436 |
| 6,745,033 | B1 | 6/2004 | Shah et al. |
| 6,754,494 | B1 | 6/2004 | Yoshimura |
| 7,457,623 | B2 | 11/2008 | Naghian et al. |
| 7,489,929 | B2 | 2/2009 | Das et al. |
| 2002/0119779 | A1 | 8/2002 | Ishikawa et al. |
| 2004/0192341 | A1 * | 9/2004 | Wang et al. ................. 455/456.1 |
| 2006/0003768 | A1 | 1/2006 | Chiou |
| 2006/0084390 | A1 * | 4/2006 | Salonaho et al. .......... 455/67.11 |
| 2008/0167041 | A1 * | 7/2008 | Wang et al. .................... 455/436 |
| 2009/0005043 | A1 * | 1/2009 | Claussen et al. .............. 455/436 |
| 2009/0075648 | A1 * | 3/2009 | Reed et al. ..................... 455/424 |

OTHER PUBLICATIONS

International Search Report (Feb. 4, 2009, 3 pages).  
Written Opinion from EPO (Nov. 17, 2009, 5 pages).

* cited by examiner

*Primary Examiner* — Michael Faragalla  
*Assistant Examiner* — William Lu  
(74) *Attorney, Agent, or Firm* — The Maxham Firm

(57) ABSTRACT

A method for preventing ping-pong handover in mobile radio networks having a multiplicity of stationary base stations at a distance from one another, and also stationary and/or moveable mobile radio stations, such as mobile radio telephones, which are in the transmission and reception range of the base stations. Repeated unwanted handover of a mobile radio station in the connected/active mode from a source base station to a destination base station is reduced or prevented. System messages are transmitted between the mobile radio stations and the base station, wherein the system messages for initiating the handover are used to transmit historical information relating to handovers which have already been performed, that information being used to automatically ascertain and set optimum operating parameters for the mobile radio stations and/or at least one of the base stations which are involved. The aim is to develop a method for preventing ping-pong handover in mobile radio networks, specifically in networks with network elements from different manufacturers, such that the parameters, particularly the hysteresis of the reception field strength, of the mobile radio and/or of the base stations are automatically set independently, to prevent ping-pong handover, without the need for expensive measurement trips with "manual" measurements.

19 Claims, 1 Drawing Sheet

METHOD FOR PREVENTING PING-PONG HANDOVER IN MOBILE RADIO NETWORKS

FIELD OF THE INVENTION

This invention relates generally to a method for preventing ping-pong handover in mobile radio networks, particularly in networks having network elements from different manufacturers.

BACKGROUND OF THE INVENTION

Ping-pong handover is understood to mean multiple unwanted handovers of a mobile radio station (for example, a cell phone) in the connected/active mode (connection established), from a source base station to a target base station.

In existing mobile radio networks, for example 2G (GSM—Global System for Mobile Communication) and 3G (UMTS—Universal Mode Telecommunication System), central network components, such as the Base Station Controller (BSC) or the Radio Network Controller (RNC), are responsible for the decision of handover of a mobile radio station in the connected/active mode from one base station to another.

The handover decision is initiated by means of a manufacturer-specific handover algorithm in the BSC or RNC, on the basis of the measurement results (measurement reports) of the mobile stations or of the base stations, respectively.

The reception field intensity at the mobile radio station, as well as variables derived from it, such as the power budget, for example, primarily influence the decision as to whether a handover is to be initiated. The measurements of the reception field intensity, for example in 3G and 2G, that influence the handover decisions are sufficiently known. Because the radio field varies greatly in terms of time and space, it is necessary to take measurement values—the reception field intensity at the mobile radio station—into account in the handover decision, with a corresponding hysteresis. Up to the present, the amount of the hysteresis to be adjusted is first set to a standard value (default) and is subsequently optimized manually.

An above-average high occurrence of handovers of a mobile station between two base stations permits the conclusion that ping-pong handover behavior between these two base stations is present. Ping-pong handover behavior has been identified, only indirectly, by an unusually high occurrence of handovers, or by customer complaints concerning lost calls or poor quality.

Only by means of a subsequent measurement trip has it been possible to precisely identify the exact cause of the quality problems, that is, of the high occurrence of handovers. If it was found that the quality problems, that is, the high occurrence of handovers were caused by ping-pong handover, the handover threshold values, that is, the hysteresis in the network elements responsible, were adapted accordingly.

In the LTE (Long Term Evolution) mobile radio systems that are currently in development, also called Super 3G or 3GPP, with the elimination of a central control element and with decentralized placement of the control of the radio interface (Radio Resource Management or RRM), the probability of unwanted ping-pong handover between two base stations (for example, eNodeB) becomes greater, and thus becomes a technical challenge.

The problems to be expected become even greater in the case of eNodeB from different manufacturers that are adjacent to one another, since here, the decision algorithms used will generally be different.

US patent publication 2006/0003768 A2 discloses a method for preventing ping-pong handover in mobile radio networks having a plurality of radio cells, defined by stationary base stations disposed at a distance from one another, as well as stationary or movable mobile radio stations, or both, such as mobile radio telephones, situated in their transmission and reception region. Multiple unwanted handovers of a mobile radio station in its connected/active mode, when a connection is established, from a source base station to a target base station, are prevented by a handover method where system messages are transmitted between the mobile radio stations and the base stations, also for initiation of the handover process. In the system messages for initiation of the handover process, data concerning handover processes are transmitted, and optimal operating parameters of the mobile radio station or at least one of the participating base stations, or both, are automatically determined and set by the mobile radio station or by at least one of the participating base stations, or both.

SUMMARY OF EMBODIMENTS OF THE INVENTION

It is a purpose of the present invention, proceeding from the state of the art as indicated initially, to provide a method for preventing ping-pong handover in mobile radio networks, particularly in networks having network elements from different manufacturers. The method functions in such a manner that the parameters, particularly the hysteresis of the reception field intensity, of the mobile radio network or of the base stations, or both, are automatically set independently, without cost-intensive "manual" measurement trips being required.

It is characteristic for embodiments of the invention that in the corresponding system messages for initiation of the handover, the corresponding historical data concerning handovers that have already occurred are transmitted. By means of these historical data, the optimal parameters, particularly the hysteresis of the reception field intensity of the mobile radio device, are automatically determined and set by the system.

It is an advantage that in this way, manual optimization measures can be reduced or actually become completely unnecessary, and costs can be saved. In this way, it is also possible that the mobile radio system optimizes itself, without the corresponding manufacturer-specific decision algorithms (RRM algorithms) having to be disclosed.

In order to implement a self-optimizing method, it is necessary:

To recognize that ping-pong handover behavior is occurring. To take countermeasures to prevent ping-pong handover, such as adaptation of hysteresis values, handover thresholds, as well as RRM parameters, in general, for example.

A ping-pong handover can be recognized on the basis of the data of the previous handover.

By means of additional transmission of the data concerning the handover preceding the current handover, it is possible for the target base station (e.g. eNodeB) to recognize whether or not ping-pong handover is present, and to take appropriate countermeasures to prevent future ping-pong handover.

Data for recognition of a ping-pong handover are:

Identifiers of the last base station requesting the handover. Reason for the handover request of a base station, such as, for example, load, field intensity, power budget, quality, distance, etc.) and the frequency of these handover requests per time unit.

If these data are transmitted in the corresponding system messages of a mobile radio network, in addition to handover requests, it is possible for the decision algorithms implemented in the network elements to recognize ping-pong handover and to adapt their configuration parameters, for example, the hysteresis, or handover thresholds, is applied until ping-pang handovers cease occurring.

BRIEF DESCRIPTION OF THE DRAWING

The invention is further described below by means of the subsequent detailed description of advantageous embodiment examples of the invention, reference being made to accompanying drawing, wherein.

DETAILED DESCRIPTION OF EMBODIMENTS OF THE INVENTION

Figure 1:
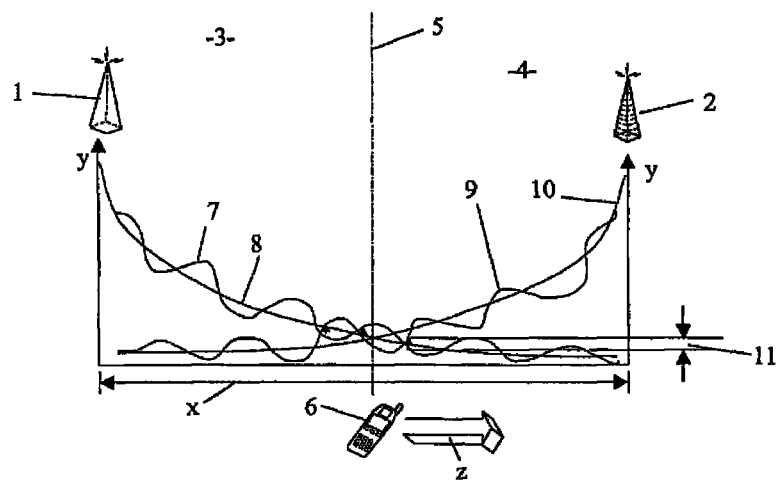
FIG. 1 is a fundamental schematic of the field intensity values between two adjacent base stations having too low a hysteresis of the reception field intensity of the mobile radio device situated between the base stations, according to the state of the art.

With reference now to the drawing, FIG. 1 shows a field intensity diagram according to the prior art, between two adjacent base stations 1, 2 that border on one another and are at a distance X from one another, defining radio cells 3, 4. Mobile radio device 6, in the form of a cell phone, is situated at boundary region 5.

The field intensity emitted by left base station 1 is shown as reception field intensity 7 that can actually be received by mobile radio device 6, in the form of a non-periodic wave line. Curve 8, which slopes downwardly from left to right, corresponds to the average of reception field intensity 7.

The same holds true for right base station 2, whose emitted field intensity is shown as reception field intensity 9 that can actually be received by mobile radio device 6, in the form of a non-periodic wave line. Curve 10, which slopes upwardly from left to right, corresponds to the average of reception field intensity 9.

Mobile radio device 6 is shown situated at the boundary 5 between radio cells 3, 4 of base stations 1, 2. The two average values 8, 10 of reception field intensities 7, 9 have approximately the same value Y at boundary 5.

The prior art handover process is carried out in this boundary region with approximately equal average values 8, 10 of the reception field intensity values 7, 9. Depending on the triggering criteria (for example, handover threshold value with hysteresis of field intensity values 7, 9) of mobile radio device 6, a switch from one base station 1, 2 to the other base station 2, 1 is then carried out, and mobile radio device 6 therefore is signed off in one radio cell 3, 4 and signed on in the other radio cell 4, 3.

In order to prevent mobile radio device 6 from constantly switching from one base station 1, 2 to the other, and thereby switching between radio cells 3, 4, specific triggering criteria are predefined, for example, as a handover threshold 11 with hysteresis of reception field intensity values 7, 9 of mobile radio device 6, here shown as arrows pointing upward, which hysteresis 11 is the difference of reception field intensity values 7, 9 of mobile radio device 6.

If a predefined level difference between reception field intensity values 7, 9 of mobile radio device 6 proceeding from base stations 1, 2 is not exceeded, then mobile radio device 6 remains with the base station 1 or 2 where it is signed on, and no handover is performed. If the level difference is exceeded, a handover of mobile radio device 6 from the signed-on base station 1 or 2 to its adjacent base station 2 or 1, which has a higher reception field intensity 9 or 7, takes place.

Alternatively, or in addition to the handover criterion of handover threshold value 11 with hysteresis, the absolute values of reception field intensity values 7, 9, or general Radio Resource Management (RRM) parameters, or both, can also be used.

Figure 2:
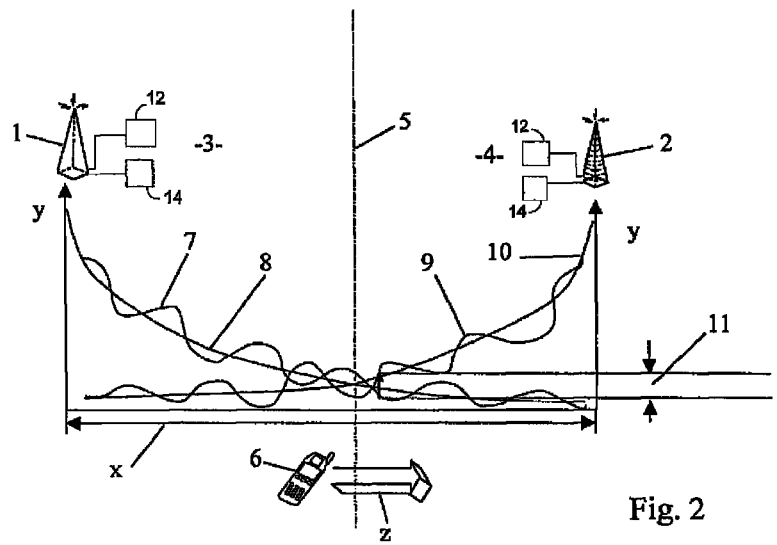
FIG. 2 is a fundamental schematic of the field intensity values between two adjacent base stations with optimized hysteresis of the reception field intensity of the mobile radio device situated between the base stations, according to an embodiment of the present invention.

FIG. 2 shows the distribution of reception field intensity values 7, 9 of mobile radio network 6 between the two base stations 1, 2 according to an embodiment of the invention. In this case handover threshold value 11 with hysteresis, that is, the level difference plus minus hysteresis tolerance between reception field intensity values 7, 9, is significantly greater than in FIG. 1. This demonstrates an improved or optimized value.

The movement direction of mobile radio device 6 from left base station 1 to right base station 2, that is, from left radio cell 3 to right radio cell 4, for example, is indicated by reference symbol "Z" in both figures. The movement direction of mobile radio device 6 can, of course, also be opposite to movement direction Z, so that the movement takes place from right to left, out of right radio cell 4 into left radio cell 3, from right base station 2 to left base station 1.

With further reference to FIG. 2, optimal operating parameters, including optimal hysteresis tolerances, may be automatically determined and set by a parameter determining and setting unit 12 connected to each of the source and target base stations 1, 2. The parameter determining and setting unit 12 may use historical data concerning handover processes that have already been carried out. This historical data may be stored in a historical data memory 14, also connected to each of the source and target base stations 1, 2. The historical data contained in the historical data memories 14 may include the reason for the handover request of a base station (1, 2), such as reception and/or transmission field intensity (7, 9) of the mobile radio station (6) or the base station (1, 2), or both, and the frequency of the handover requests of a base station per unit time. The optimal operating parameters of the mobile radio stations and/or at least one of the participating base stations (1, 2) may also contain difference values (11) with hysteresis tolerances of the reception and/or transmission field intensity values (7, 9) of the mobile radio stations (6) and/or at least one of the participating base stations (1, 2).

What is claimed is:

1. A method for accomplishing handovers of a mobile radio station in a connected/active mode from a source base station to a target base station within a mobile radio network having a plurality of cells defined by stationary base stations spaced apart from one another, the method comprising the steps of:
while a mobile radio station is in a connected/active mode, by using a controller of the source base station or of the mobile radio network, starting a handover process by causing system messages to be transmitted between the mobile radio station and base stations located within transmitting and receiving range of the mobile radio station, wherein the system messages include handover data;
applying the handover data to determine and automatically set optimal operating parameters of the mobile radio station and/or of at least one of the source and target base stations;

wherein repeated unwanted handovers of the mobile radio station in its connected/active mode when a connection is established from a source base station to a target base station are prevented by the steps of:

including in the handover data, stored historical data concerning handover processes that have already been carried out, wherein the handover data contain the reasons for a handover request of the source base station, the reasons selectively including at least one of: reception and/or transmission field intensity of the mobile radio station and/or the source base station; and the frequency of the handover requests of the source base station per time unit; and applying the stored historical data, including the frequency of the handover requests, in order to determine and automatically set the optimal operating parameters, including operating hysteresis tolerances of the mobile radio station, wherein the set optimal operating parameters of the mobile radio stations and/or at least one of the source and target base stations contain difference values with hysteresis tolerances of the reception and/or transmission field intensity values of the mobile radio stations and/or said at least one of the source and target base stations.

2. The method according to claim 1, wherein the historical data contains the identifier of the base station that last requested the handover.

3. The method according to claim 1, wherein the optimal operating parameters of the mobile radio stations and/or at least one of the source and target base stations contain predefined upper and/or lower absolute values of the reception and/or transmission field intensity values, which are particularly set in the corresponding network elements that trigger the handover.

4. The method according to claim 2, wherein the optimal operating parameters of the mobile radio stations and/or at least one of the source and target base stations contain predefined upper and/or lower absolute values of the reception and/or transmission field intensity values, which are particularly set in the corresponding network elements that trigger the handover.

5. The method according to claim 1, wherein the optimal operating parameters of the mobile radio stations contain Radio Resource Management (RRM) parameters, which are particularly set by the mobile radio stations.

6. The method according to claim 2, wherein the optimal operating parameters of the mobile radio stations contain Radio Resource Management (RRM) parameters, which are particularly set by the mobile radio stations.

7. The method according to claim 3, wherein the optimal operating parameters of the mobile radio stations contain Radio Resource Management (RRM) parameters, which are particularly set by the mobile radio stations.

8. The method according to claim 1, wherein the mobile radio network is a GSM, UMTS, or LTE mobile radio network or an equivalent mobile radio network.

9. The method according to claim 8, wherein the mobile radio network is WiMAX.

10. The method according to claim 2, wherein the mobile radio network is a GSM, UMTS, or LTE mobile radio network or an equivalent mobile radio network.

11. The method according to claim 10, wherein the mobile radio network is WiMAX.

12. The method according to claim 3, wherein the mobile radio network is a GSM, UMTS, or LTE mobile radio network or an equivalent mobile radio network.

13. The method according to claim 12, wherein the mobile radio network is WiMAX.

14. The method according to claim 5, wherein the mobile radio network is a GSM, UMTS, or LTE mobile radio network or an equivalent mobile radio network.

15. The method according to claim 14, wherein the mobile radio network is WiMAX.

16. The method according to claim 1, wherein the networks have network elements from different manufacturers.

17. The method according to claim 3, wherein the networks have network elements from different manufacturers.

18. The method according to claim 5, wherein the networks have network elements from different manufacturers.

19. The method according to claim 8, wherein the networks have network elements from different manufacturers.

* * * * *